(12) United States Patent
Bergonnier et al.

(10) Patent No.: US 9,273,704 B2
(45) Date of Patent: Mar. 1, 2016

(54) DOOR ACTUATOR COMPRISING MEANS FOR SETTING TO ATMOSPHERIC PRESSURE IN A RAPID MANNER AT THE END OF OPENING THE DOOR

(71) Applicant: RATIER FIGEAC, Figeac (FR)

(72) Inventors: Hélène Bergonnier, Figeac (FR); Eric Delbos, Lacapelle-Marival (FR)

(73) Assignee: RATIER FIGEAC, Figeac Cedix (FR)

( * ) Notice: Subject to any disclaimer, the term of this patent is extended or adjusted under 35 U.S.C. 154(b) by 556 days.

(21) Appl. No.: 13/707,124

(22) Filed: Dec. 6, 2012

(65) Prior Publication Data

US 2013/0145928 A1    Jun. 13, 2013

(30) Foreign Application Priority Data

Dec. 7, 2011   (FR) ...................................... 11 61259

(51) Int. Cl.
*F15B 15/22*    (2006.01)
*F15B 15/19*    (2006.01)
*F15B 11/048*   (2006.01)

(52) U.S. Cl.
CPC ............... *F15B 15/19* (2013.01); *F15B 11/048* (2013.01); *F15B 15/22* (2013.01)

(58) Field of Classification Search
CPC ......... F15B 11/048; F15B 15/19; F15B 15/22
See application file for complete search history.

(56) References Cited

U.S. PATENT DOCUMENTS

| 4,026,192 | A  | * | 5/1977 | Noren et al. ...................... 91/5 |
| 8,776,963 | B2 | * | 7/2014 | Bergonnier et al. .......... 188/284 |
| 8,998,141 | B2 | * | 4/2015 | Bergonnier et al. ....... 244/129.5 |
| 2011/0226571 | A1 |  | 9/2011 | Bergonnier et al. |

FOREIGN PATENT DOCUMENTS

| DE | 10 2004 037 060 A1 | 3/2006 |
| DE | 10 2005 035 006 A1 | 2/2007 |
| FR |    2 957 646 A1    | 9/2011 |

* cited by examiner

*Primary Examiner* — Michael Leslie
(74) *Attorney, Agent, or Firm* — Birch, Stewart, Kolasch & Birch, LLP

(57) ABSTRACT

An aircraft door actuator, including:
  a pneumatic cylinder for the opening of the door including a chamber into which a pressurized gas is injected via a first port,
  means for supplying the chamber of the cylinder with pressurized gas, via a supply pipe and said first port,
  means for setting the chamber to atmospheric pressure when the piston is in the position for opening the door, so as to allow said door to be moved into the closing position, including:
    a pressurized gas exhaust pipe
    a gate-valve
    means for guiding the opening of the gate-valve via the pressurized fluid located in the chamber when the door is in the opening position, so as to open the exhaust pipe in order to set said chamber of the cylinder to atmospheric pressure in a rapid manner once the door is open.

18 Claims, 5 Drawing Sheets

DOOR ACTUATOR COMPRISING MEANS FOR SETTING TO ATMOSPHERIC PRESSURE IN A RAPID MANNER AT THE END OF OPENING THE DOOR

The present invention relates to an aircraft door actuator, including:
- a pneumatic cylinder comprising:
  - a piston moving between first and second extreme positions in the body of the cylinder, corresponding respectively to the closing and the opening of the door,
  - a variable volume chamber into which a pressurized gas is injected via a first port for the displacement of the piston from the position for closing the door to the opening position thereof,
- one of two elements, the piston or the body of the cylinder, being connected to the door, the other to the frame,
- means for supplying said chamber of the cylinder with pressurized gas, via a supply pipe connected to the chamber by said first port,
- means for setting the chamber to atmospheric pressure when the piston is in the position for opening the door, so as to allow said door to be moved into the closing position.

This type of aircraft door actuator is generally used as an emergency opening actuator for the door. In this case, the pressurized gas is sent into the chamber of the cylinder following a manual action on an emergency opening device, for example an impact device, the effect of which is to bring about an opening of the door in an automatic manner in a very reduced time. Once the door is in the open position, it is necessary to be able to close it again equally rapidly, in a manual manner. To do this, it is necessary that the chamber of the cylinder is no longer pressurized. By way of example, in the event of a pressurized gas tank or a pyrotechnic gas generator supplying the cylinder for opening the door, it can be necessary to wait for the tank to be emptied or for the energy potential conferred on the generator to be exhausted in order to close the door again, which involves too long a waiting time before it is possible to close the door again. The cylinder can be a deadened pneumatic cylinder, for example as described in document FR 2 957 646, or a non-deadened pneumatic cylinder.

The present invention allows this disadvantage to be remedied. Moreover, the invention proposes setting the chamber of the cylinder to atmospheric pressure in an extremely rapid manner. More precisely, the door actuator as claimed in the invention is characterized in that said means for setting the chamber to atmospheric pressure include:
- a pressurized gas exhaust pipe, one end of which is connected to said chamber via said first port, and the opposite end of which is connected to atmospheric pressure,
- a gate-valve, the body of which is arranged in series over said exhaust pipe, and the obturator of which adopts at least the two following positions:
  - a position for closing the exhaust pipe,
  - a position for opening the exhaust pipe,
- means for guiding the obturator of the gate-valve, comprising a principal fluid pipe for controlling the displacement of the obturator from the position closing the exhaust pipe toward the open position thereof, one end of which is connected to the body of the gate-valve in such a manner that the fluid located in said principal fluid pipe exerts a force on the obturator, and the other end of which is connected to a second port formed in the chamber of the cylinder and arranged in such a manner that said second port is situated outside the chamber when the piston is in the position for closing the door, or is in the process of opening said door, and is situated in the chamber when the door is in the open position so as to actuate, in said second position of the piston, the obturator of the gate-valve by means of the compressed gas present in the chamber and in this way to open said exhaust pipe in order to set the chamber of the cylinder to atmospheric pressure in a rapid manner once the door has been opened.

As claimed in the invention, setting the chamber to atmospheric pressure once the door is open is immediate or quasi immediate, by means of a circuit dedicated quasi completely to the operation of release, and notably as concerns the release gate-valve, and the pressure drops of which can thus be reduced to the minimum. In the position for opening the door, the chamber is set to atmospheric pressure via the first port for supplying the chamber with pressurized gas. Still in said position for opening the door, the pressurized gas, always originating, should this arise, from the means for supplying the chamber with pressurized gas, is also directed toward the outside at atmospheric pressure via the exhaust pipe, which frees the chamber from continued pressurization once the door is open by means of the residual gas. The exhaust pipe is connected to the first port of the chamber of the cylinder, directly or indirectly, which is also the supply port, so that the door can be moved into the closing position with said first port, still open, opening out into the chamber of the cylinder. In this way, it is possible for the door to be moved into the closed position well before the means for supplying the pressurized gas into the chamber are exhausted, for example, where a pressurized tank or a pyrotechnic generator supplies the chamber, well before the tank or the pyrotechnic generator is empty.

According to an advantageous characteristic, said means for guiding the obturator of the gate-valve also include a secondary fluid pipe for continuing the guiding of the obturator of the gate-valve, a first end of which is connected to a port opening out into a chamber of the gate-valve, defined between the gate-valve body and the obturator, with variable volume, which is formed when the obturator has started to move from the position closing the exhaust pipe toward the position opening said exhaust pipe in such a manner that the gas contained in said secondary fluid pipe exerts a force on the obturator in order to hold the latter in the position opening the exhaust pipe, and the second end of which is connected to means for supplying said chamber of the cylinder with pressurized gas.

Said characteristic allows the holding of the obturator of the gate-valve in the position opening the exhaust pipe to be ensured when the door has started to be closed again and when the piston of the cylinder, by its displacement from its second position toward its first position under the effect of the manual closure of the door, has made the second port come out of said chamber of the cylinder, the volume of which reduces at the same time as the door closes. Due to the fact that the second port can thus no longer by supplied by the pressurized gas contained in the chamber, the pressurized gas originating from the circuit supplying the chamber supplied from a pressurized gas source takes over in order to ensure the obturator is held in the position opening the exhaust pipe until the door is moved into the closed position, this advantageously being before the means for supplying the chamber with pressurized gas are exhausted. Obviously, said gate-valve chamber is inactive as long as the pressurized gas contained in the chamber has not penetrated the principal pipe guiding the obturator and started to move the latter. In the position of the gate-valve obturator corresponding to the closure of the exhaust pipe, the secondary fluid pipe for continuing the guiding of the gate-valve obturator does not supply the gate-valve chamber which preferably adopts a zero volume in said position of the obturator.

According to an advantageous characteristic, the aircraft door actuator as claimed in the invention also includes a device for expanding pressurized gas originating from said means for supplying the chamber of the cylinder with pressurized gas, disposed in series over said supply pipe.

The expanding device allows for a delayed emergency opening of the door.

According to an advantageous characteristic, said secondary fluid pipe for continuing the guiding of the obturator of the gate-valve is connected to said pipe for supplying pressurized gas, upstream of said device for expanding the pressurized gas.

Said characteristic allows direct action from the pressurized gas source on the chamber of the gate-valve and therefore on the obturator, so as to optimize the pressurized gas resources for holding the obturator of the gate-valve in the position opening the exhaust pipe for as long as possible.

According to an advantageous characteristic, said pressurized gas exhaust pipe comprises a fluid part which is shared with said supply pipe.

In this way, the part of the exhaust pipe which leaves the gate-valve toward the first port of the chamber of the cylinder can be connected upstream of said first port on the pipe supplying the chamber with pressurized gas.

According to an advantageous characteristic, said gate-valve of the means for setting the chamber to atmospheric pressure comprises a resilient means for resetting the obturator, with the exhaust pipe in the closed position.

In an advantageous manner, said means for resetting the obturator ensures an automatic return to the initial position of the gate-valve (closure of the exhaust pipe) for a new configuration of the actuator in the operational position for an emergency opening of the door.

According to an advantageous characteristic, said means for supplying the chamber of the cylinder with pressurized gas include a pressurized gas tank.

According to an advantageous characteristic, as an alternative to the preceding one, said means for supplying the chamber of the cylinder with pressurized gas include a pyrotechnic gas generator.

Other characteristics and advantages will become clear on reading what follows concerning an exemplary embodiment of an aircraft door actuator as claimed in the invention, together with the accompanying figures, the example being given purely for illustrative purposes and not being limiting.

FIGS. 1 to 5 show five successive stages of operation of an emergency opening actuator for an aircraft door.

Figure 1:
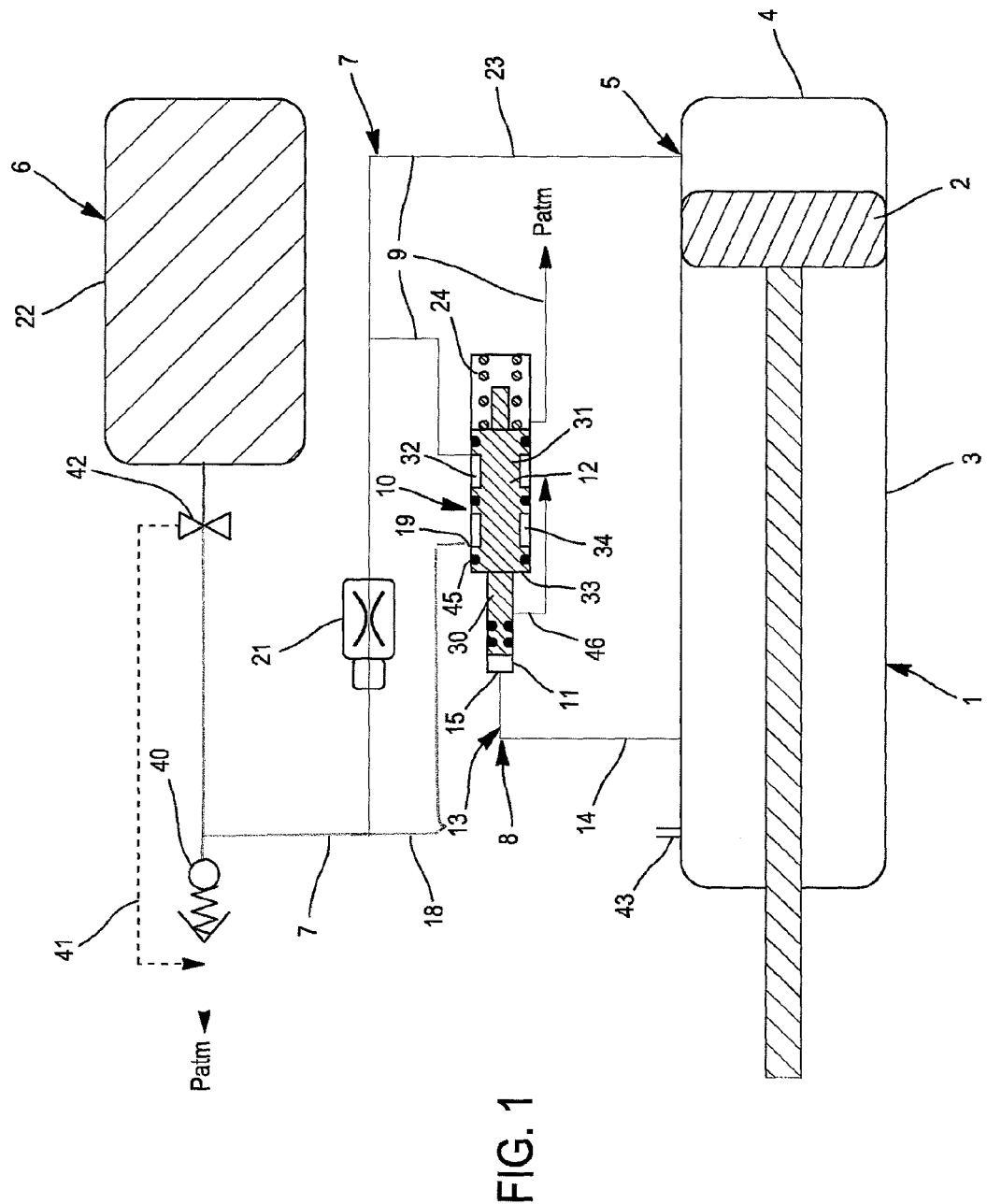
FIG. 1 shows a schematic view of an exemplary embodiment of an actuator for an emergency opening of an aircraft door, with the door closed and the actuator idle.

The aircraft door actuator shown in the figures includes:
a pneumatic cylinder 1 comprising:
  a piston 2 moving between first and second extreme positions in the body 3 of the cylinder, corresponding respectively to the closing (FIG. 1) and the opening (FIG. 3) of the door,
  a variable volume chamber 4 into which a pressurized gas is injected via a first port 5 for the displacement of the piston 2 from the position for closing the door to its position for opening said door,
one of two elements, the piston 2 and the body 3 of the cylinder 1, being connected to the door (not shown), the other to the frame (not shown),
  means 6 for supplying the chamber 4 of the cylinder 1 with pressurized gas via a supply pipe 7 connected to the chamber by the first port 5,
  means 8 for setting the chamber 4 to atmospheric pressure when the piston 2 is in the position for opening the door, so as to allow said door to be moved into the closed position.

The pneumatic cylinder 1 and its piston 2 and its chamber 4 are of the type known and will not be described in any more detail here. The cylinder in this example is a single-acting cylinder comprising a vent 43 connected to atmospheric pressure on the side of the piston 2 opposite the chamber 4, so as not to hinder the movement of the piston. The cylinder used can be a deadened pneumatic cylinder, for example as described in document FR 2 957 646, or a non-deadened pneumatic cylinder.

The means 6 for supplying the chamber 4 of the cylinder 1 with pressurized gas, via a supply pipe 7 connected to the chamber by the first port 5, include, for example, a pressurized gas tank 22, for example also of a known type. As an alternative, said means can be a pyrotechnic gas generator.

As claimed in the invention, the means 8 for setting the chamber 4 to atmospheric pressure include:
  a pressurized gas exhaust pipe 9, one end of which is connected to the chamber 4 via the first port 5, and the opposite end of which is connected to atmospheric pressure, for example to the open air,
  a gate-valve 10, the body 11 of which is disposed in series over the exhaust pipe 9, and the obturator 12 of which adopts at least the two following positions:
    a first position in which the exhaust pipe 9 is closed,
    a second position in which the exhaust pipe 9 is open,
  means 13 for guiding the obturator 12 of the gate-valve 10, comprising a principal fluid pipe 14 for controlling the displacement of the obturator 12 from the position closing the exhaust pipe 9 toward its open position, one end 15 of which is connected to the body 11 of the gate-valve 10 in such a manner that the fluid located in the principal fluid pipe 14 exerts a force on the obturator 12, and the other end of which is connected to a second port 17 formed in the chamber 4 and arranged such that the second port 17 is situated outside the chamber 4 when the piston 2 is in the position for closing the door, and is situated in the chamber 4 when the latter is in the opening position so as to actuate, in said second position of the piston 2, the obturator 12 of the gate-valve 10 by means of the compressed gas present in the chamber 4 and in this way to open the exhaust pipe 9 in order to set the chamber 4 of the cylinder 1 to atmospheric pressure in a rapid manner once the door is open.

The gate-valve 10 is, for example, in the form of a slide valve, the obturator 12, for example, taking the form of a slide. The slide, for example, can be realized in the form of a piston with a circular cross section comprising two successive, aligned pieces with different diameters, a first piece 30 having a smaller diameter than the second piece 31. The body 11 of the gate-valve 10 comprises two successive cylindrical, aligned housings, a first and a second, with different diameters corresponding respectively to the two diameters of the slide-obturator 12 in such a manner that each piece of the slide moves its corresponding cylindrical housing in translation. The difference in diameter between the pieces of the slide-obturator 12 defines a shoulder 33 which serves as an abutment in the gate-valve body 11 in the position closing the exhaust pipe 9, corresponding to the position closing the gate-valve 10, as shown in FIG. 1.

Figure 3:
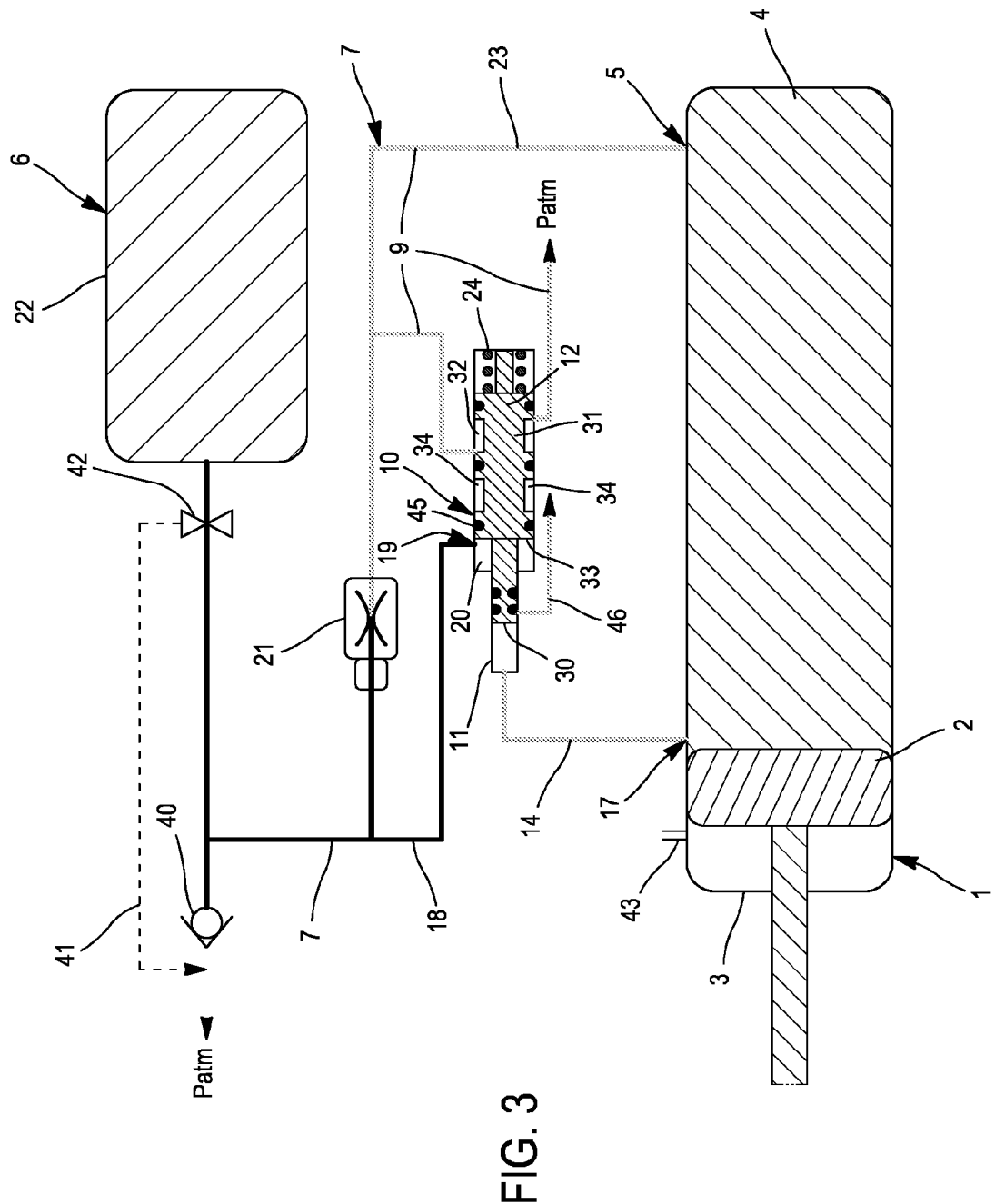
FIG. 3 shows a schematic view of the example in FIG. 1, the position of the door being open.

The principal fluid pipe 14 for controlling the movement of the slide-obturator 12 is connected to the body 11 of the gate-valve 10 so as to open out at the top of the first piece 30 of small diameter of the slide-obturator 12 and to exert a pressure force on the obturator 12 via the section of the first piece 30 of the same. At least one sealing joint of the O-ring type (two adjacent joints are shown), disposed on the first piece 30 of the slide 12, assures notably the transmission of said pressure force. In a preferred manner, the principal fluid pipe 14 is connected to the body 3 of the cylinder 1 at the immediate back of the piston 2 when said latter is situated in the position for opening the door, as shown in FIG. 3, in such a manner that said pipe 14 for guiding the gate-valve 10 is only opened when the door itself is totally open.

Figure 2:
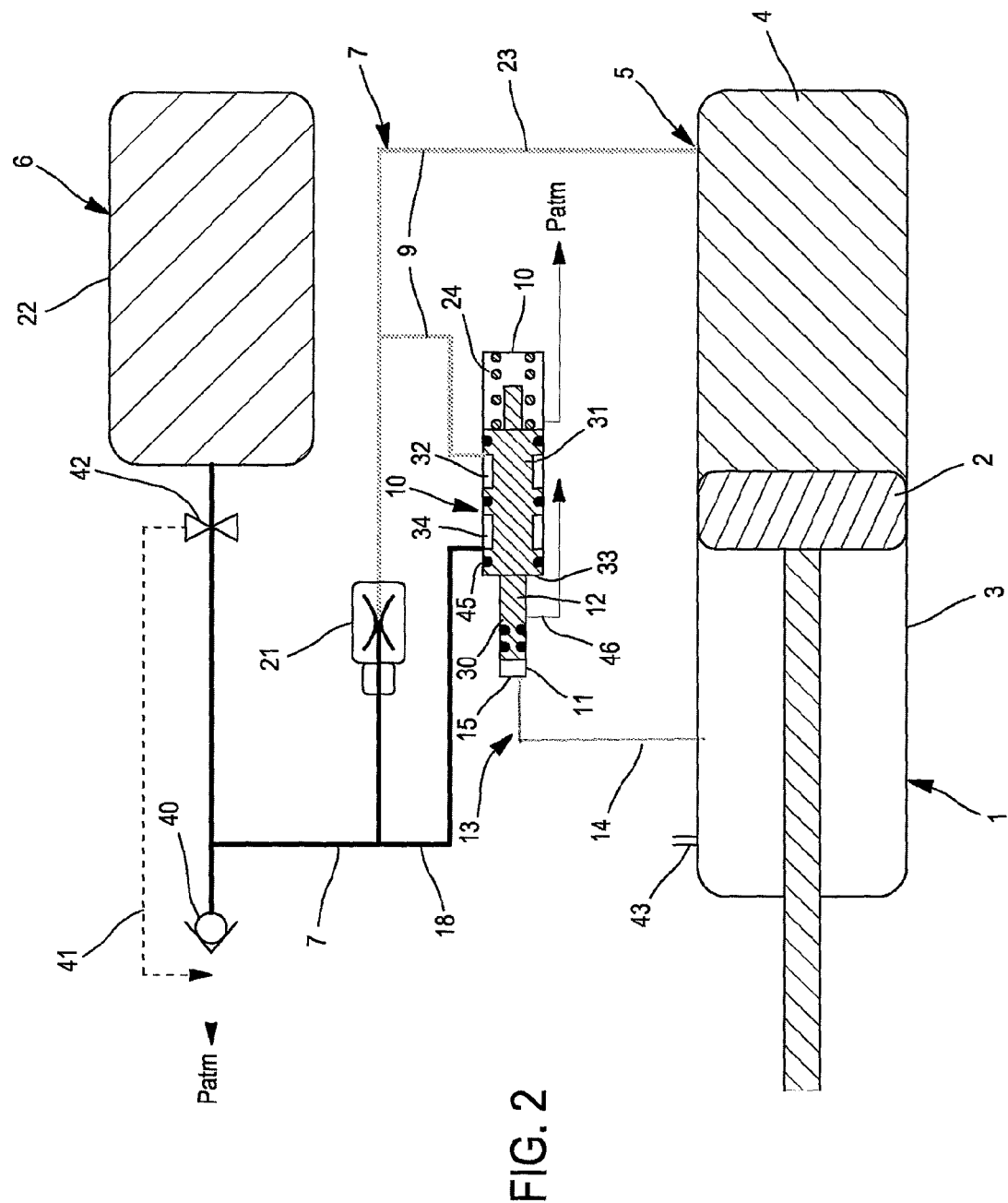
FIG. 2 shows a schematic view of the example of FIG. 1, the position of the door being in the process of an emergency opening.
Figure 4:
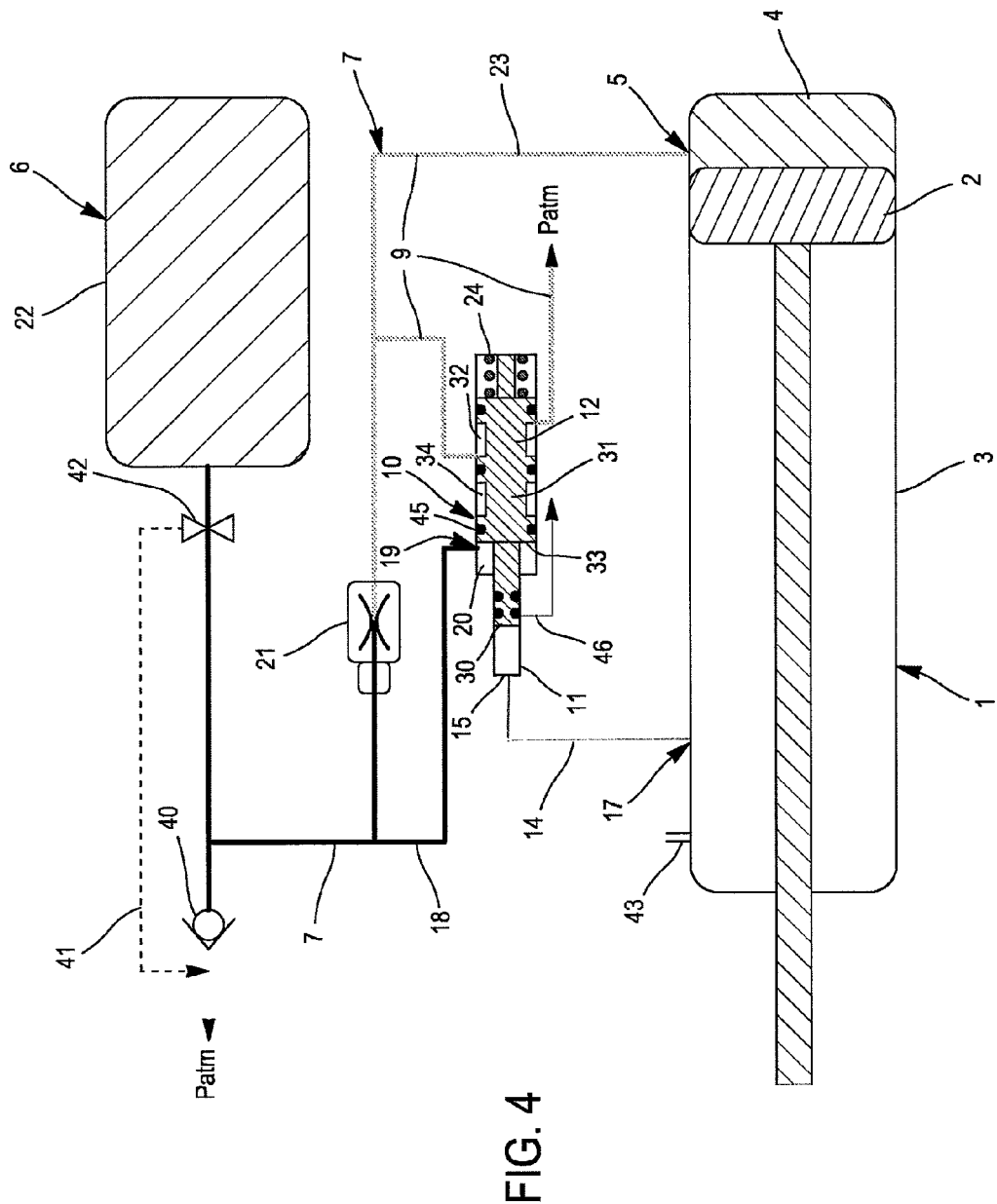
FIG. 4 shows a schematic view of the example in FIG. 1, the position of the door being brought manually to the closed position.

The exhaust pipe 9 is connected to the body 11 of the gate-valve so as to traverse in a crosswise manner the second cylindrical housing of the second piece 31 of the slide-obturator 12 as shown in FIG. 1. The second piece 31 of the slide-obturator 12 comprises, for example, a peripheral circular transverse throat 32 forming a mobile ring-shaped chamber which fluidly connects the inlet point and the outlet point of the exhaust pipe 9 in the second cylindrical housing when said throat 32 is aligned longitudinally with the inlet and the outlet of the exhaust pipe 9, as shown in FIG. 3 or 4, for the opening of the exhaust pipe 9 corresponding to the position for opening the gate-valve 10. As shown, there is a longitudinal discrepancy between the transversal inlet and outlet points of the exhaust pipe 9 in the second housing of the body of the gate-valve 10; said discrepancy allows for the insertion between said two points of part of the obturator 12 which seals with the body of the gate-valve and which, in this manner, allows the pipe 9 to be cut between said two points, in the position for closing the gate-valve 10, as shown in FIGS. 1 and 2. The length of the circular throat 32 is at least equal to the longitudinal distance separating the two points of inlet and outlet of the exhaust pipe 9 in the second cylindrical housing of the body 11 of the gate-valve 10.

In the example, the exhaust pipe 9 for the pressurized gas comprises a fluid part 23 which is shared with the supplying pipe 7. Said shared part is situated just upstream of the port 5 for the inlet of the supplying pipe into the chamber 4 and can be reduced to a minimum length in accordance with the possibilities for arranging the pipes. The part of the exhaust pipe 9 which, in the example, rejoins the pipe 7 for supplying the chamber 4 with pressurized gas upstream of the inlet port 5 into the chamber 4, is connected to the gate-valve in such a manner that said part of the pipe 9 opens out into the ring-shaped chamber 32 in the position for closing the gate-valve 10, during the displacement of the obturator 12, and still opens out into said ring-shaped chamber 32 in the position for opening the gate-valve 10 as shown in FIG. 3. As shown, as a result of the discrepancy between the transversal inlet and outlet points of the exhaust pipe 9 in the body of the gate-valve 10, the obturator 12 only opens said latter for example at the end of the displacement of the obturator into the open position.

In a preferred manner, the gate-valve 10 of the means 8 for setting the chamber 4 to atmospheric pressure comprises a resilient means 24 for resetting the obturator 12 into the position for closing the exhaust pipe 9, as shown in the figures. In the example, said resilient resetting means 24 adopts the form of a helical spring exerting thrust on the end of the second piece of the slide-obturator 12 which is opposite the shoulder 33, which aims to return the slide-obturator 12 in abutment against the body 11 of the gate-valve via the shoulder 33, in the position for closing the gate-valve 10, as shown in FIGS. 1 and 2.

The basic operation of the gate-valve 10 described above is as follows:
  when a pressurized gas penetrates the small cylindrical housing of the body of the valve for the small piece 30 of the slide 12, the bearing surface (cross section of the small piece) is determined such that, in accordance with the pressure available to control the opening of the gate-valve, the slide 12 moves into the position for opening the gate-valve 10 against the return force exerted by the spring 24,
  when the pressure of the gas present in the small housing is less than the specified pressure for opening the gate-valve 10, the spring acts and returns the slide into the position for closing the gate-valve 10.

In FIG. 3, the pressurized gas has penetrated into the chamber 4 of the cylinder 1 after an operator has started up the emergency opening of the door, for example in a known manner by smashing a lid of the tank 22 so as to release the pressurized gas it contains into the supply pipe 7; the pressurized gas has had the effect and has moved the piston 2 and is shown in the position for opening the door, the second port 17 therefore being opened in the chamber 4 at the back of the piston 2 in its position for opening the door, as shown in FIG. 3. In this way, the pressurized gas contained in the chamber 4, which corresponds at the end of the opening of the door to the residual pressure after displacement of the piston 2, penetrates into the small housing of the gate-valve 10 and actuates the opening of said latter by the displacement of the slide 12 so as to open the exhaust pipe 9 of the gas contained in the chamber 4 by a direct path and minimizing the pressure drops, and so as to reduce the pressure in the chamber 4 of the cylinder as rapidly as possible in order to bring the door into the closing position, in a manual manner, by displacing the door which induces a reverse displacement of the piston 2.

In an advantageous manner, the means 13 for guiding the obturator 12 of the gate-valve 10 also include a secondary fluid pipe 18 for continuing the guiding of the obturator 12 of the gate-valve 10, one first end of which is connected to a port 19 opening out in a chamber 20 of the gate-valve 10, defined between the body 11 of the gate-valve and the obturator 12, with variable volume, which is formed when the obturator 12 has started to move from the position for closing the exhaust pipe 9 toward the position for opening the exhaust pipe 9 in such a manner that the gas contained in the secondary fluid pipe 18 exerts a force on the obturator 12 in order to hold said latter in the position for opening the exhaust pipe 9 against the resilient return force of the spring 24. The second end of the secondary fluid pipe 18 for continuing the guiding of the obturator 12 of the gate-valve 10 is itself connected to the means 6 for supplying the chamber 4 of the cylinder with pressurized gas, preferably to the pipe 7 supplying the chamber 4 of the cylinder with pressurized gas, as shown in the figures.

As shown in FIGS. 3 and 4, the chamber 20 of the gate-valve 10 is for example formed in the large cylindrical housing of the gate-valve, between the shoulder 33 of the slide 12 and the abutment face of said shoulder 33 on the body 11 of the gate-valve 10. Said chamber 20 is therefore non-existent when the valve 10 is in the closed position in agreement with FIGS. 1 and 2, and only forms when the gas of the chamber 4 has displaced the slide 12. As shown in FIGS. 1 and 2, in the position for closing the gate-valve 10, the secondary fluid pipe 18 opens out into the large cylindrical housing of the body 11 of the gate-valve 10, below the shoulder 33 by a given distance, in a mobile ring-shaped chamber 34 defined by a circular peripheral throat formed in the large piece 31 of the slide 12. Said ring-shaped chamber 34 is tight and does not induce any action, on the slide 12, under the effect of the pressurized gas originating from the supply pipe 7. The given distance below the ring-shaped chamber 34 with regard to the shoulder 33 is defined such that there is a possibility for locating at least one sealing joint 45 on the slide, between the abutment 33 of the slide and the ring-shaped chamber 34 such that said chamber 34 does not communicate in a fluid manner with the chamber 20. In the event of said joint 45 failing, and so that the pressurized air which is sent into the pipe 18 during an emergency opening does not provoke the untimely opening of the gate-valve 10 by the introduction of pressurized air between the shoulder 33 and its face bearing on the body 11 of the gate-valve 10, which opening is untimely in particular before the door is completely open, said gate-valve 10 includes a pipe 46 for setting to atmospheric pressure behind the joint 45.

The ring-shaped chambers 34 and 32 are made tight by means of sealing joints, for example O-ring seals, as shown.

Figure 5:
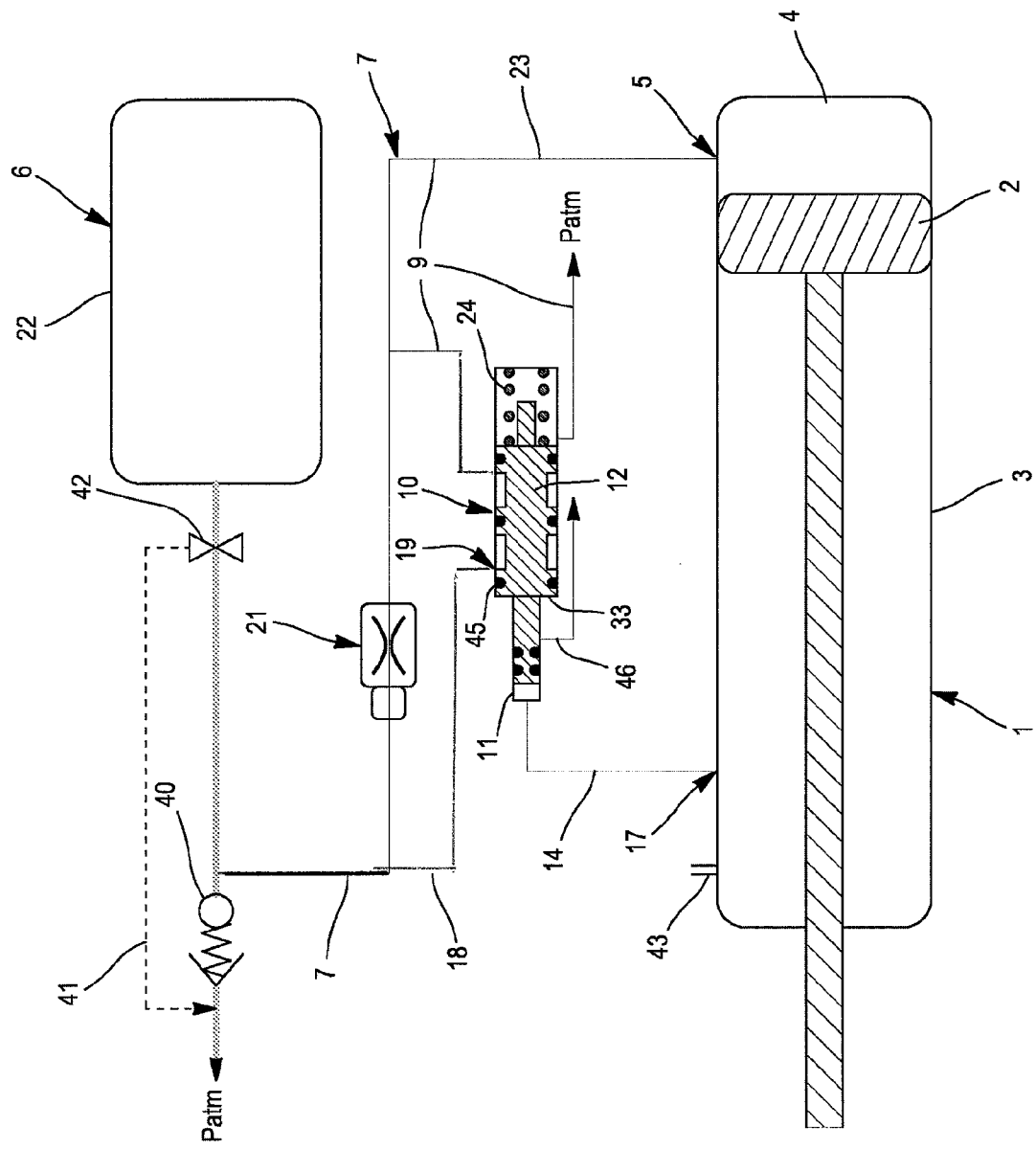
FIG. 5 shows a schematic view of the example in FIG. 1, the position of the door being brought manually to the closed position as shown in FIG. 4, the means for supplying the cylinder with pressurized gas also being exhausted.

The secondary operation of the gate-valve 10 described above is as follows:

when the door has started to be closed again, the piston 2 of the cylinder, by reducing the volume of the chamber 4, makes the port 17 come out of said chamber as shown in FIG. 4 or 5, cutting the supply of pressurized gas to the pipe 14 for the principal guiding of the gate-valve; as soon as the door has started to be closed again, the gate-valve 10 would therefore close again under the effect of the return spring 24;

when the door remains held open for a few moments before being closed again manually, the pressure in the chamber 4 drops quasi instantaneously following the opening of the gate-valve 10 via its principal fluid guiding pipe 14, the gas contained in the chamber 4 escaping very rapidly through the exhaust pipe 9 with a minimum of pressure losses; as a result, the pressure in the principal fluid pipe 14 falls and is no longer sufficient to hold the gate-valve 10 open against the return force of the spring 24; as soon as the pressure falls in the chamber 4, the valve 10 would therefore close again under the effect of the return spring 24; in the event of a delay in closing, said closing could no longer be effected by the exhaust pipe 9;

in the two cases above, so as to keep the exhaust pipe 9 open long enough for the door to close, the secondary fluid pipe 18 for guiding the gate-valve takes over from the principal guiding pipe 14 when said latter is no longer supplied, and keeps the gate-valve 10 open under the pressure of the residual gas originating directly from the tank 22, which bestows extra time on the system for possibly emptying the chamber 4 completely, and above all for the simultaneous or differed closure of the door. When the door has been completely closed again, as shown in FIG. 4 or 5, and when the residual pressure of the tank 22 has dropped, the obturator 12 of the gate-valve 10 is brought into the closing position by the spring 24 as shown in FIG. 5. It must be noted that, once the door has closed again as shown in FIG. 4, the exhaust pipe 9 serves to empty the tank completely of pressurized gas, should it be necessary, since the gate-valve 10 for closing said pipe 9 only closes again if the pressure of the gas originating from the supplying means has dropped as shown in FIG. 5.

In an advantageous manner, as shown in the figures, the actuator also includes a device 21 for expanding pressurized gas originating from the means 6 for supplying the chamber 4 of the cylinder 1 with pressurized gas, said expansion device 21 being disposed in series over the supply pipe 7. In a preferred manner, the connection between the exhaust pipe 9 and the supply pipe 7 is made downstream of the expansion device 21. Also in a preferred manner, the secondary fluid pipe 18 for continuing the guiding of the obturator 12 of the gate-valve 10 is connected to the pipe 7 for supplying pressurized gas, upstream of the device 21 for expanding pressurized gas; in this way, the residual pressure for supplying the gate-valve 10 by the secondary pipe 18 is optimized by avoiding going through the expander 21.

As shown in the figures, and in a known manner and by way of example only, the emergency actuator of an aircraft door includes a spring flap-valve 40 which allows the door to be maneuvered when there is no pressurized gas in the supply pipe 7, as shown in FIG. 1, that is to say when the emergency opening has not been activated. The flap-valve 40 is closed automatically under the effect of the pressurized gas released into the supply pipe 7, as shown in FIGS. 2, 3, and 4. The flap-valve 40 is opened again when the means for supplying pressurized gas are exhausted, and when the gate-valve 10 is closed again, as shown in FIG. 5. The flap-valve 40 is placed upstream of the expansion device 21, as shown in the figures.

The emergency actuator shown can also include, in a known manner and equally by way of example only, a pipe 41 for by-passing the flap-valve 40, associated with a gate-valve 42 for by-passing the pressurized gas in the event of accidentally breaking the lid of the tank 22, constituting a safety system aiming to avoid the pressurized gas being sent as far as the port 5 of the chamber of the cylinder in the event of untimely opening of the tank.

In short, the actuator operates in the following manner:

an operator activates the emergency opening of the door, the effect of which is to send a pressurized gas into the supply pipe 7 and into the chamber 4 of the cylinder via the first port 5;

the piston 2 moves in the cylinder under the effect of the pressurized gas, which provokes the rapid opening of the door, until the piston 2 has carried out its travel in the cylinder;

in the position for opening the door, the pipe 14 for guiding the opening of the exhaust gate-valve 10 is supplied with pressurized gas originating from the chamber 4 and opens the gate-valve 10, the effect of which is to set the chamber to atmospheric pressure very rapidly;

the operator can close the door again very rapidly after its opening, in a manual manner, so doing by driving the gas contained in the chamber 4 to the outside through the exhaust pipe 9 which opens out into the open, the possible residual gas originating from the tank 22 also being directed toward the outside by the exhaust pipe 9;

during said stage, the gate-valve 10 is held open if necessary by the secondary pipe for guiding the gate-valve which is supplied by the residual pressurized gas contained in the tank; in the case of the example described, said secondary supply is necessary due to the existence of a means for automatically resetting to the position closing the exhaust gate-valve 10;

when the pressure in the tank 22 has fallen, the spring 24 closes the gate-valve 10 again; the flap-valve 40 is also opened automatically when the pressure in the tank has dropped; the actuator is thus placed in position for a new opening after a change in the tank, in this example using a tank for supplying the chamber of the cylinder with pressurized gas.

The invention claimed is:

1. An aircraft door actuator, including:
a pneumatic cylinder comprising:
a piston moving between first and second extreme positions in a body of the cylinder, corresponding respectively to the closing and the opening of the door,
a variable volume chamber into which a pressurized gas is injected via a first port for the displacement of the piston from the position closing the door to the position opening it,
one of two elements, the piston and the body of the cylinder, being connected to the door, the other to the frame,
means for supplying said chamber of the cylinder with pressurized gas, via a supply pipe connected to the chamber by said first port,
means for setting the chamber to atmospheric pressure when the piston is in the position for opening the door, so as to allow said door to be moved into the closed position,
in which door actuator said means for setting the chamber to atmospheric pressure include:
a pressurized gas exhaust pipe, one end of which is connected to said chamber via said first port, and the opposite end of which is connected to atmospheric pressure,
a gate-valve, a body of which is arranged in series over said exhaust pipe, and an obturator of which adopts at least the two following positions:
a position for closing the exhaust pipe,
a position for opening the exhaust pipe,
means for guiding the obturator of the gate-valve, comprising a principal fluid pipe for controlling the displacement of the obturator from the position for closing the exhaust pipe toward its position for opening, one end of which is connected to the body of the gate-valve in such a manner that the fluid located in said principal fluid pipe exerts a force on the obturator, and the other end of which is connected to a second port formed in the chamber of the cylinder and arranged in such a manner that said second port is situated outside the chamber when the piston is in the position for closing the door, or is in the process of opening said latter, and is situated in the chamber when the door is in the position for opening so as to actuate, in said second position of the piston, the obturator of the gate-valve by means of the compressed gas present in the chamber and in this way to open said exhaust pipe so as to set the chamber of the cylinder to atmospheric pressure in a rapid manner once the door has been opened.

2. The aircraft door actuator as claimed in claim 1, in which said means for guiding the obturator of the gate-valve also include a secondary fluid pipe for continuing the guiding of the obturator of the gate-valve, a first end of which is connected to a port opening out into a chamber of the gate-valve, defined between the gate-valve body and the obturator, with variable volume, which is formed when the obturator has started to move from the position for closing the exhaust pipe toward the position for opening said exhaust pipe in such a manner that the gas contained in said secondary fluid pipe exerts a force on the obturator in order to hold said latter in the position for opening the exhaust pipe, and the second end of which is connected to means for supplying said chamber of the cylinder with pressurized gas.

3. The aircraft door actuator as claimed in claim 2, also including a device for expanding the pressurized gas originating from said means for supplying the chamber of the cylinder with pressurized gas, disposed in series over said supply pipe.

4. The aircraft door actuator as claimed in claim 3, in which said secondary fluid pipe for continuing the guiding of the obturator of the gate-valve is connected to said pipe for supplying pressurized gas, upstream of said device for expanding the pressurized gas.

5. The aircraft door actuator as claimed in claim 1, in which said pressurized gas exhaust pipe comprises a fluid part which is shared with said supply pipe.

6. The aircraft door actuator as claimed in claim 1, in which said gate-valve of the means for setting the chamber to atmospheric pressure comprises a resilient means for resetting the obturator, with the exhaust pipe in the closed position.

7. The aircraft door actuator as claimed in claim 1, in which said means for supplying the chamber of the cylinder with pressurized gas include a pressurized gas tank.

8. The aircraft door actuator as claimed in claim 1, in which said means for supplying the chamber of the cylinder with pressurized gas include a pyrotechnic gas generator.

9. The aircraft door actuator as claimed in claim 2, in which said pressurized gas exhaust pipe comprises a fluid part which is shared with said supply pipe.

10. The aircraft door actuator as claimed in claim 3, in which said pressurized gas exhaust pipe comprises a fluid part which is shared with said supply pipe.

11. The aircraft door actuator as claimed in claim 4, in which said pressurized gas exhaust pipe comprises a fluid part which is shared with said supply pipe.

12. The aircraft door actuator as claimed in claim 2, in which said gate-valve of the means for setting the chamber to atmospheric pressure comprises a resilient means for resetting the obturator, with the exhaust pipe in the closed position.

13. The aircraft door actuator as claimed in claim 3, in which said gate-valve of the means for setting the chamber to atmospheric pressure comprises a resilient means for resetting the obturator, with the exhaust pipe in the closed position.

14. The aircraft door actuator as claimed in claim 4, in which said gate-valve of the means for setting the chamber to atmospheric pressure comprises a resilient means for resetting the obturator, with the exhaust pipe in the closed position.

15. The aircraft door actuator as claimed in claim 5, in which said gate-valve of the means for setting the chamber to atmospheric pressure comprises a resilient means for resetting the obturator, with the exhaust pipe in the closed position.

16. The aircraft door actuator as claimed in claim 2, in which said means for supplying the chamber of the cylinder with pressurized gas include a pressurized gas tank.

17. The aircraft door actuator as claimed in claim 3, in which said means for supplying the chamber of the cylinder with pressurized gas include a pressurized gas tank.

18. The aircraft door actuator as claimed in claim 4, in which said means for supplying the chamber of the cylinder with pressurized gas include a pressurized gas tank.

* * * * *